Oct. 31, 1939.　　　F. C. GRISWOLD　　　2,178,257
DRAFTING APPLIANCE
Filed May 12, 1938　　　2 Sheets-Sheet 1
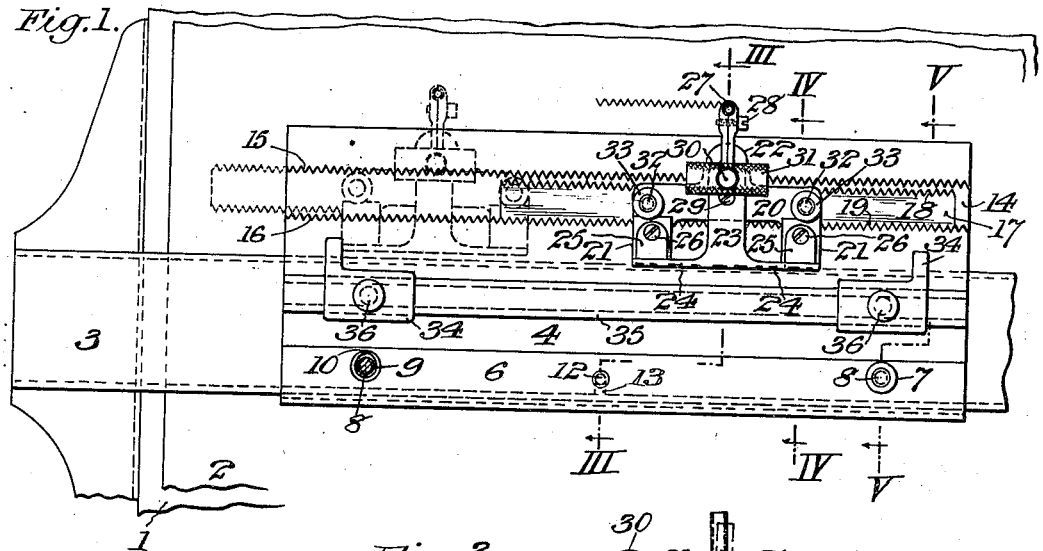
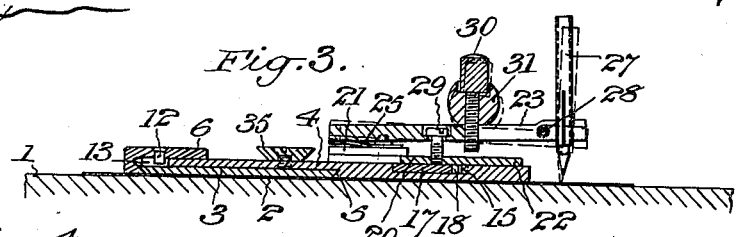
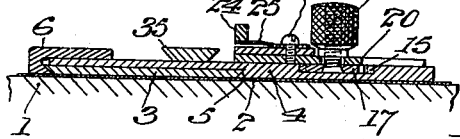
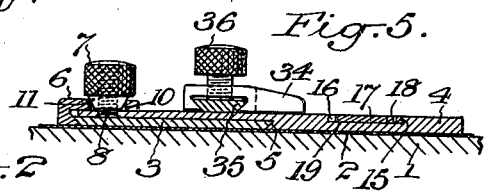
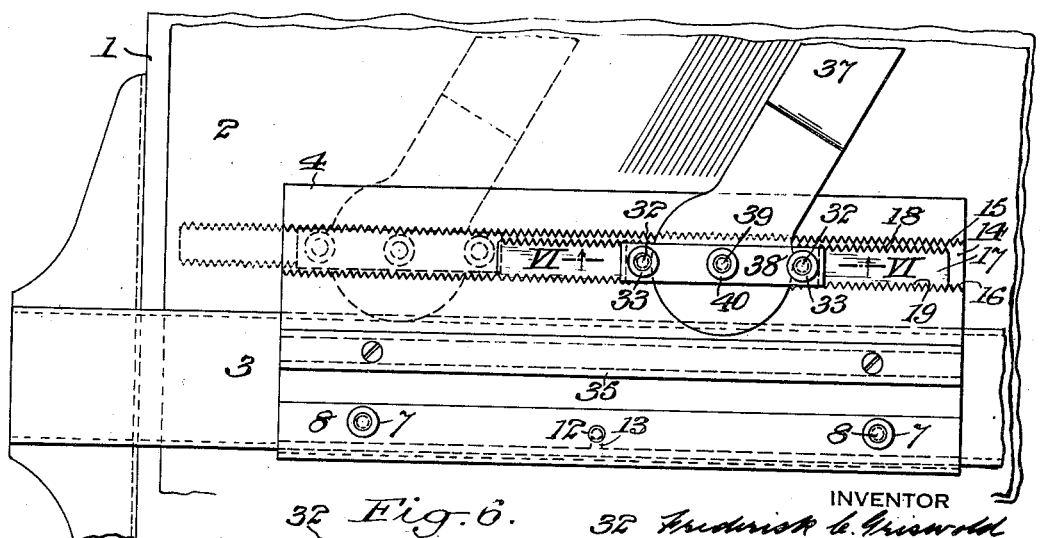
INVENTOR
Frederick C. Griswold
BY
ATTORNEYS Oct. 31, 1939.   F. C. GRISWOLD   2,178,257
DRAFTING APPLIANCE
Filed May 12, 1938   2 Sheets-Sheet 2
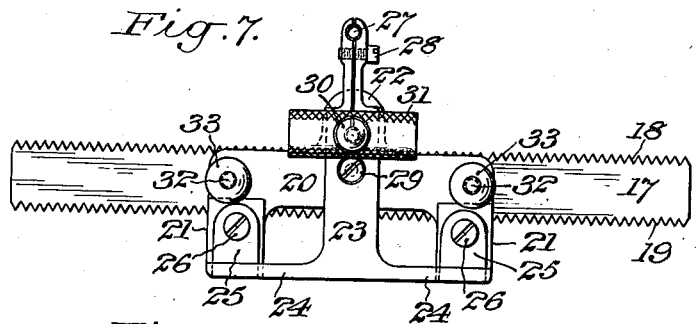
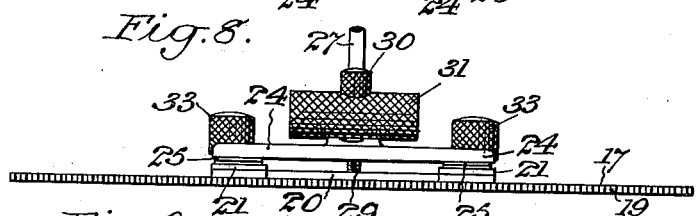
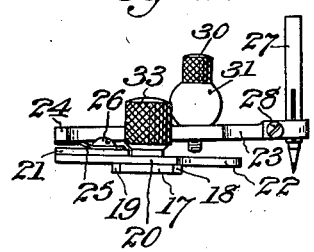
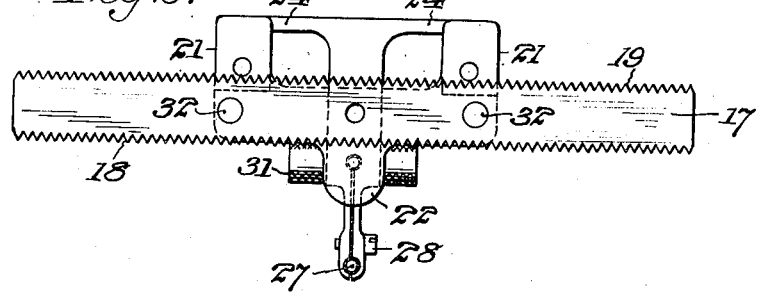
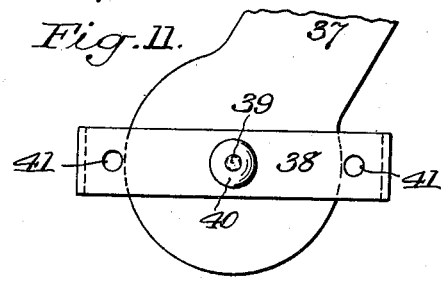
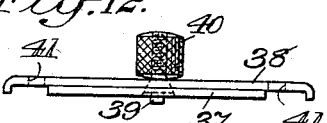
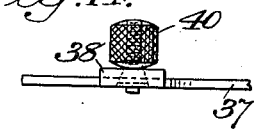
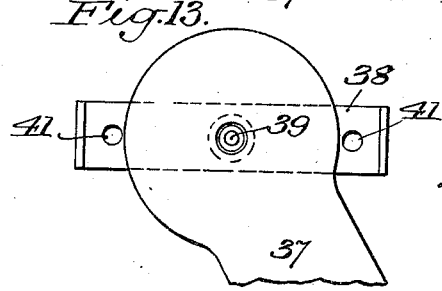
INVENTOR
Frederick C. Griswold
BY
ATTORNEYS Patented Oct. 31, 1939

2,178,257

UNITED STATES PATENT OFFICE 2,178,257

DRAFTING APPLIANCE

Frederick C. Griswold, Port Jefferson, N. Y.

Application May 12, 1938, Serial No. 207,429

16 Claims. (Cl. 33—110)

One object of my invention is to provide an appliance including a marker attachment whereby screw-threads of the desired pitches and lengths may be easily and accurately drawn on a suitable surface, such as the exposed surface of a sheet of drawing paper.

Another object is to provide an appliance including a ruler attachment, whereby a series of accurately spaced parallel lines may be drawn upon a suitable surface, such as the exposed surface of a sheet of drawing paper, at any desired angle.

My appliance is shown as adapted to be adjusted along and clamped to the blade of a T-square, although it may be associated with any support suitable for the purpose.

My appliance comprises, generally, certain members which are standard and other members which are replaceable, as will more fully hereinafter appear.

A practical embodiment of my invention is represented in the accompanying drawings, in which Fig. 1 represents a detail top plan view illustrating my appliance with the marker attachment in its operative position for drawing a screw-thread of a predetermined pitch on the exposed surface of a sheet;

Fig. 2 represents a similar view illustrating my appliance with its ruler attachment in its operative position for drawing on the exposed surface of a sheet, parallel lines with a predetermined spacing and angularity;

Fig. 3 represents a cross section taken in the planes of the line III—III of Fig. 1, looking in the direction of the arrows;

Fig. 4 represents a detail cross section taken in the plane of the line IV—IV of Fig. 1, looking in the direction of the arrows;

Fig. 5 represents a detail section taken in the planes of the line V—V of Fig. 1, looking in the direction of the arrows;

Fig. 6 represents a detail section taken in the plane of the line VI—VI of Fig. 2, looking in the direction of the arrows;

Fig. 7 represents a top plan view of the spacer bar with the marker fastened thereto;

Fig. 8 represents a side view of the same;

Fig. 9 represents an inverted plan view of the same;

Fig. 10 represents an end view of the same;

Fig. 11 represents a detail plan view of the ruler and its bridge;

Fig. 12 represents an end view of the same;

Fig. 13 represents an inverted plan view of the same; and

Fig. 14 represents a detail end view of the same.

The drawing board is denoted by 1, the drawing sheet by 2, and the T-square blade by 3. A base plate 4 is provided with an open-ended undercut groove 5 extending lengthwise along its bottom for slidably receiving the T-square blade 3. A laterally adjustable blade clamping strip 6 extends along one edge of the base plate 4 and it provides one side of the undercut groove 5.

The means for clamping the base plate at any desired position along the T-square blade is as follows: I provide two clamp nuts 7, 7 which are threaded on screws 8, 8, uprising from the base plate 4. These screws extend upwardly through enlarged holes 9, 9 having inner vertical side walls 10, 10 (see Fig. 5) which are arranged to be engaged by tapers 11, 11 on the nuts 7, 7 as they are screwed home, to move the strip 6 inwardly into clamping engagement with the T-square blade 3. A pin 12 depending from the strip 6 into a transverse open-ended slot 13 in the base plate 4 serves to prevent the strip 6 from shifting endwise along the base plate when its clamping means are loosened.

This base plate 4 also has an open-ended shallow groove 14 extending lengthwise along its top, which groove is provided with toothed sides 15 and 16. A flat spacer bar 17 is slidably mounted in the groove 14, said bar being provided with toothed sides 18 and 19.

The toothed sides of the shallow groove bear such a relationship to the toothed sides of the spacer bar that the spacer bar is guided step by step in a zig-zag movement in the desired direction when manipulated by the operator. For instance, the tooth relationship is such that when the teeth along one side of the spacer bar are fully in mesh with their teeth along the side of the shallow groove the teeth along the opposite side of the spacer bar have their points exactly over the points of the teeth along the opposite side of the shallow groove.

The attachment for marking screw-threads is removably secured to the spacer bar 17, which attachment is provided with a marking element arranged and operated to mark the sheet 2 by pencil, ink, or other medium, as follows: A bottom plate 20 is provided with end branches 21, 21 projecting from its inner edge and a middle branch 22 projecting from its outer edge.

The holder for the marking element comprises an arm 23 provided at its inner end with oppositely projecting arms 24, 24 connected at their ends by flat springs 25, 25 secured to the branches 21, 21 of the bottom plate 20, as for instance by fastening screws 26, 26.

The outer end of the arm 23 is adapted to hold the marking element, which is herein shown as a pencil, 27 with its point arranged to be depressed into contact with the exposed surface of the sheet 2 when it is desired to mark thereon. In the present instance the outer end of the arm 23 is split to embrace the marking element 27, a clamp screw 28 being employed to removably clamp the element to its holder.

The upward movement of the marking element under the tension of the springs 25, 25 is adjustably limited by a set screw 29 loosely carried by the holder arm 23 and threaded into the bottom plate 20.

The downward movement of the marking element is adjustably limited by an adjusting screw 30 threaded through the marker arm 23, said screw 30 also passing through the handle bar 31 which is used for manipulating the marker.

The marker attachment is secured to the spacer bar 17 by providing the bar with two screws 32, 32 which project upwardly from the spacer bar through the bottom plate 20; clamp nuts 33, 33 being threaded on said screws for removably clamping the bottom plate to the spacer bar.

The zig-zag step by step movement of the spacer bar 17 and its marker may be adjustably limited in both directions by stops 34, 34 slidably mounted on an undercut bar 35 secured to the top surface of the base plate 4; set screws 36, 36 being provided for clamping the stops to the bar 35 in their adjusted positions.

The attachment for permitting the marking of parallel spaced lines of any desired angle, by the zig-zag step by step movement of the spacer bar is constructed, arranged, and operated as follows: The marker attachment is first removed from the spacer bar by unscrewing the clamp nuts 33, 33 from the screws 32, 32. A ruler 37 is pivoted to a bridge bar 38 by a screw 39 and its clamping nut 40. This bridge bar has holes 41, 41 therethrough for receiving the screws 32, 32 uprising from the spacer bar 17. The clamp nuts 33, 33 may then be replaced on the set screws and turned down to clamp the bridge bar to the spacer bar and the ruler between the bridge bar and the spacer bar in its desired angular adjustment.

The spacer bar may then be moved step by step along the base plate 4 to move the ruler along the sheet 2 to the desired positions to permit the parallel lines to be successively drawn on the sheet.

It will be understood that the base plate 4 and the spacer bar 17 are replaceable by similar members with a different number of teeth in a given length formed along the sides of the groove 14 and the spacer bar 17, to draw screw-threads of various pitches and parallel lines of various spacings.

The base plate and the spacer bar are the only members of the appliance that need to be replaced for different requirements, the other elements of the appliance being standard, it being understood that when the screw-thread marker attachment is used the ruler attachment is not used, and vice versa.

It is evident that various changes may be resorted to in the construction, form and arrangement of the several parts without departing from the spirit and scope of my invention, and hence I do not intend to be limited to the particular embodiment herein shown and described, but

What I claim is:

1. In a drafting appliance, relatively fixed and movable members, one member having two outwardly disposed toothed edges and the other member having two inwardly disposed toothed edges separated by a parallel space to receive the first named member, said relatively fixed and movable members having freedom of motion with respect to each other to permit alternate engagement of successive teeth for guiding one member in a zig-zag movement with relation to the other member.

2. In a drafting appliance, relatively fixed and movable members, one member having two outwardly disposed toothed edges and the other member having two inwardly disposed toothed edges separated by a parallel space to receive the first named member, said relatively fixed and movable members having freedom of motion with respect to each other to permit alternate engagement of successive teeth for guiding one member in a zig-zag movement with relation to the other member, and a drafting attachment carried by the movable member.

3. In a drafting appliance, a base plate having a groove, a spacer bar slidable therein, and coacting rows of teeth along the sides of the groove and spacer bar for guiding the spacer bar step by step in a zig-zag movement along the base plate.

4. In a drafting appliance, relatively fixed and movable members, one member having two outwardly disposed toothed edges and the other member having two inwardly disposed toothed edges separated by a parallel space to receive the first named member, said relatively fixed and movable members having freedom of motion with respect to each other to permit alternate engagement of successive teeth for guiding one member in a zig-zag movement with relation to the other member, and a ruler attachment carried by the movable member.

5. In a drafting appliance, a base plate having a groove, a spacer bar slidable therein, coacting rows of teeth along the sides of the groove and spacer bar for guiding the spacer bar step by step in a zig-zag movement along the base plate, and a drafting attachment carried by said spacer bar.

6. In a drafting appliance, a base plate having a groove, a spacer bar slidable therein, coacting rows of teeth along the sides of the groove and spacer bar for guiding the spacer bar step by step in a zig-zag movement along the base plate, and a drafting attachment removably mounted on said spacer bar.

7. In a drafting appliance, a movable support, a base plate slidably mounted thereon, means for clamping the base plate to the movable support, said base plate having a groove, a spacer bar slidable in said groove, and coacting rows of teeth along the sides of the groove and spacer bar for guiding the spacer bar step by step in a zig-zag movement along the base plate.

8. In a drafting appliance, a movable support, relatively fixed and movable members, one member having two outwardly disposed toothed edges and the other member having two inwardly disposed toothed edges separated by a parallel space to receive the first named member, said relatively fixed and movable members having freedom of motion with respect to each other to permit alternate engagement of successive teeth for guiding one member in a zig-zag movement with relation to the other member, and means for clamping one of the members to the support.

9. In a drafting appliance, a movable support, a base plate slidably mounted thereon, means for clamping the base plate to the movable support, said base plate having a groove, a spacer bar slidable in said groove, coacting rows of teeth along the sides of the groove and spacer bar for guiding the spacer bar step by step in a zig-zag movement along the base plate, and a drafting attachment carried by said spacer bar.

10. In a drafting appliance, a movable support, a base plate slidably mounted thereon, means for clamping the base plate to the movable support, said base plate having a groove, a spacer bar slidable in said groove, coacting rows of teeth along the sides of the groove and spacer bar for guiding the spacer bar step by step in a zig-zag movement along the base plate, and a drafting attachment removably mounted on said spacer bar.

11. In a drafting appliance, a base plate, a spacer bar slidable thereon, coacting means on the base plate and spacer bar for guiding the spacer bar step by step with a zig-zag movement along the base plate and a marker attachment removably mounted on the spacer bar comprising a bottom plate, a marking element, a spring pressed holder therefor yieldingly connected to the bottom plate, and means for limiting the upward and downward movements of the marking element.

12. In a drafting appliance, a base plate, a spacer bar slidable thereon, coacting means on the base plate and spacer bar for guiding the spacer bar step by step with a zig-zag movement along the base plate and a ruler attachment carried by the spacer bar comprising a bridge, a ruler pivoted thereto, and a common means for clamping the bridge and ruler to the spacer bar.

13. In a drafting appliance, a base plate, a spacer bar slidable thereon, coacting means on the base plate and spacer bar for guiding the spacer bar step by step with a zig-zag movement along the base plate and a ruler attachment removably mounted on the spacer bar comprising a bridge, a ruler pivoted thereto, and a common means for clamping the bridge and ruler to the spacer bar.

14. In a drafting appliance, a base plate, a spacer bar slidable endwise thereon, coacting means on the base plate and spacer bar for guiding the spacer bar step by step with a zig-zag movement along the base plate, and adjustable devices for limiting the endwise movements of the spacer bar.

15. In a drafting appliance, a base plate, a spacer bar slidable endwise thereon, coacting means on the base plate and spacer bar for guiding the spacer bar step by step with a zig-zag movement along the base plate, a bar extending along the base plate, and end stops adjustably locked to said bar for limiting the endwise movement of the spacer bar.

16. In a drafting appliance, a base plate, a spacer bar slidable thereon, coacting means on the base plate and spacer bar for guiding the spacer bar step by step with a zig-zag movement along the base plate and a marker attachment carried by the spacer bar comprising a bottom plate, a marking element, a spring pressed holder therefor yieldingly connected to the bottom plate, and means for limiting the upward and downward movements of the marking element.

FREDERICK C. GRISWOLD.